United States Patent
Kluge et al.

(10) Patent No.: US 11,708,873 B2
(45) Date of Patent: Jul. 25, 2023

(54) FREEWHEEL FOR A MOTOR VEHICLE DRIVE TRAIN

(71) Applicant: Bayerische Motoren Werke Aktiengesellschaft, Munich (DE)

(72) Inventors: Benjamin Kluge, Munich (DE); Sebastian Liebert, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 65 days.

(21) Appl. No.: 17/299,416

(22) PCT Filed: Nov. 13, 2019

(86) PCT No.: PCT/EP2019/081087
§ 371 (c)(1),
(2) Date: Jun. 3, 2021

(87) PCT Pub. No.: WO2020/114733
PCT Pub. Date: Jun. 11, 2020

(65) Prior Publication Data
US 2022/0056966 A1 Feb. 24, 2022

(30) Foreign Application Priority Data
Dec. 4, 2018 (DE) ...................... 10 2018 130 783.7

(51) Int. Cl.
*F16D 41/16* (2006.01)
(52) U.S. Cl.
CPC .................... *F16D 41/16* (2013.01)
(58) Field of Classification Search
CPC ........ F16D 41/12; F16D 41/125; F16D 41/14; F16D 41/16
See application file for complete search history.

(56) References Cited

U.S. PATENT DOCUMENTS

| 5,054,594 A | 10/1991 | Kaempf et al. |
| 7,721,860 B2 | 5/2010 | Saka |

(Continued)

FOREIGN PATENT DOCUMENTS

| CN | 105393029 A | 3/2016 |
| CN | 105952813 A | 9/2016 |

(Continued)

OTHER PUBLICATIONS

PCT/EP2019/081087, International Search Report dated Mar. 13, 2020 (Two (2) pages).

(Continued)

*Primary Examiner* — Lori Wu
(74) *Attorney, Agent, or Firm* — Crowell & Moring LLP (57) ABSTRACT

A freewheel for a motor vehicle drive train includes a locking pawl carrier which is rotatable with respect to a rotational axis, first and second locking pawls fastened pivotably in a locking pawl receptacle where the locking pawl receptacle is fixedly coupled to the locking pawl carrier. A shaft is rotatable about the rotational axis and has first and second coupling depressions in which the first and second locking pawls are respectively engageable. A switching ring is coupled fixedly to the locking pawl carrier so as to rotate with the locking pawl carrier and the switching ring is movable along the rotational axis by an actuator. A position of the switching ring is detectable by a sensor. A movement of the switching ring in one direction loads the first and second locking pawls in opposite pivoting directions and fixes a position of the first and second locking pawls.

12 Claims, 5 Drawing Sheets

(56) References Cited

U.S. PATENT DOCUMENTS

| | | | |
|---|---|---|---|
| 2008/0223681 A1* | 9/2008 | Stevenson | F16D 28/00 |
| | | | 477/174 |
| 2015/0176662 A1* | 6/2015 | Lee | F16D 41/06 |
| | | | 192/85.18 |
| 2016/0131205 A1 | 5/2016 | Essenmacher | |
| 2016/0327102 A1 | 11/2016 | Chen et al. | |
| 2017/0254376 A1 | 9/2017 | Campton et al. | |
| 2018/0010651 A1* | 1/2018 | Kimes | F16H 63/304 |
| 2018/0100551 A1 | 4/2018 | Campton et al. | |

FOREIGN PATENT DOCUMENTS

| | | |
|---|---|---|
| CN | 106050978 A | 10/2016 |
| CN | 107076225 A | 8/2017 |
| DE | 39 22 222 A1 | 1/1991 |
| DE | 10 2014 214 628 A1 | 2/2015 |
| DE | 10 2015 204 687 A1 | 9/2016 |
| DE | 10 2017 203 179 A1 | 9/2017 |
| DE | 11 2016 001 214 T5 | 11/2017 |

OTHER PUBLICATIONS

German Search Report issued in German application No. 10 2018 130 783.7 dated Jul. 5, 2019, with Statement of Relevancy (Seven (7) pages).

Chinese Office Action issued in Chinese application No. 201980067417.0 dated Mar. 21, 2022, with English translation (Thirteen (13) pages).

* cited by examiner

FREEWHEEL FOR A MOTOR VEHICLE DRIVE TRAIN

BACKGROUND AND SUMMARY OF THE INVENTION

The invention relates to a freewheel for a motor vehicle drive train, with a locking pawl carrier which can be rotated with regard to a rotational axis and has pivotable locking pawls, and with a shaft which can be rotated about the rotational axis.

It can be necessary in a motor vehicle drive train for a shaft to be coupled rotatably with respect to a further rotating shaft in a switchable manner.

In the prior art, free wheels with a clutch function are known, in which each rotational direction is actuated separately. Solutions also exist for locking the two rotational directions by way of one actuator, but all the pawls have to be sensed individually in the case of the solutions.

It is therefore the object of the invention to provide a freewheel which requires few actuators and sensors, in order to optionally couple the shaft to the locking pawl carrier, and is therefore inexpensive to produce.

The object is achieved by way of a freewheel for a motor vehicle drive train, with a locking pawl carrier which can be rotated with regard to a rotational axis and to which at least one first locking pawl and at least one second locking pawl are fastened pivotably in a locking pawl receptacle, a shaft which can be rotated about the rotational axis and has at least two coupling depressions, into which in each case one associated locking pawl can penetrate and can couple the shaft fixedly in a respective associated rotational direction to the locking pawl carrier so as to rotate with it, at least one switching ring which is coupled fixedly to the locking pawl carrier so as to rotate with it, and can be moved along the rotational axis by way of an actuator between a first position and a second position, the at least one switching ring pivoting the first and the second locking pawl, at least one sensor which detects the position of the switching ring, the first and the second locking pawl engaging in a positively locking manner into the provided coupling depressions in a coupling position, with the result that the first locking pawl couples the locking pawl carrier and the shaft fixedly so as to rotate together in a first rotational direction, and the second locking pawl couples the locking pawl carrier and the shaft fixedly so as to rotate together in a second rotational direction, and a movement of the at least one switching ring in one direction loading the first and the second locking pawl in opposite pivoting directions and fixing the position of the locking pawls.

Accordingly, the invention is based on the basic concept that the movement of the switching ring loads the first and second locking pawls in different pivoting directions, with the result that, in the coupling position, the first locking pawl couples the shaft and the locking pawl carrier fixedly so as to rotate together in the first rotational direction, and the second locking pawl couples the shaft and the locking pawl carrier fixedly so as to rotate together in the second rotational direction. The switching ring is configured in such a way that the position of the switching ring relative to the locking pawl carrier can be unambiguously assigned a pivoting position of the first and second locking pawl, with the result that, by way of the position of the at least one switching ring, the pivoting position of the first and second locking pawl is also known. Accordingly, in the minimum case, the freewheel comprises only one sensor and one actuator and is therefore inexpensive to produce.

The freewheel can comprise a single switching ring which switches all the locking pawls, with the result that simple assembly is possible.

As an alternative, the freewheel can comprise a second switching ring which can be moved axially relative to the first switching ring, the first switching ring actuating at least one locking pawl which couples the shaft and the locking pawl carrier fixedly so as to rotate together in one rotational direction, and the second switching ring actuating at least one locking pawl which couples the shaft and the locking pawl carrier fixedly so as to rotate together in an opposite rotational direction. This makes an asynchronous engagement of the first and second locking pawls possible.

In order to ensure simple actuation of the locking pawls, the at least one switching ring can comprise at least one first rod and at least one second rod which are configured at least in sections parallel to the rotational axis and are coupled at a first rod end to the associated at least one switching ring, in particular are fastened to the associated switching ring, the first and the second rod loading the associated locking pawl.

In one refinement of the invention, the at least one first rod has a first switching face which interacts with the locking pawl and tapers conically toward a second rod end. The at least one second rod can likewise have a second switching face which interacts with the locking pawl and tapers conically toward the first rod end. In this way, inexpensive manufacturing of the freewheel is possible. In one movement, therefore, the two rods become switching devices on account of the switching faces which run in opposite directions.

In order to make a simple asynchronous actuation of the first and second locking pawls possible, the first and the second switching ring can comprise in each case at least one first and at least one second rod which are configured at least in sections parallel to the rotational axis and are coupled at a first rod end to the first and the second switching ring, respectively. The rods of the first switching ring can load the first locking pawl and the rods of the second switching ring can load the second locking pawl.

The first and second switching face can likewise lie offset axially with respect to one another, and the locking pawls are arranged axially between the switching faces. This makes short shifting travels for the two rods of a locking pawl possible.

In one refinement of the invention, the rods can extend into a recess of the locking pawl receptacle, and can be mounted axially displaceably in the locking pawl carrier. In this way, a compact configuration of the freewheel is possible.

In order for it to be possible for the switching rings to be actuated in a simple manner, the at least one switching ring can have, at least in sections, a radially inwardly pointing projection, on which the actuator acts.

The actuator can likewise be stationary and, in particular, can be configured as a magnetic actuator.

The actuator can comprise at least one coil, with the result that the switching ring can be moved with little technical complexity. The coil acts directly on the at least one switching ring.

In order to prevent an unintended movement of the switching ring, the locking pawl carrier can comprise a latching means, in particular a ball latching means, which loads the switching ring in the first and/or second position.

Further features and advantages of the invention result from the following description and from the appended drawings.

DETAILED DESCRIPTION OF THE DRAWINGS

Figure 1:
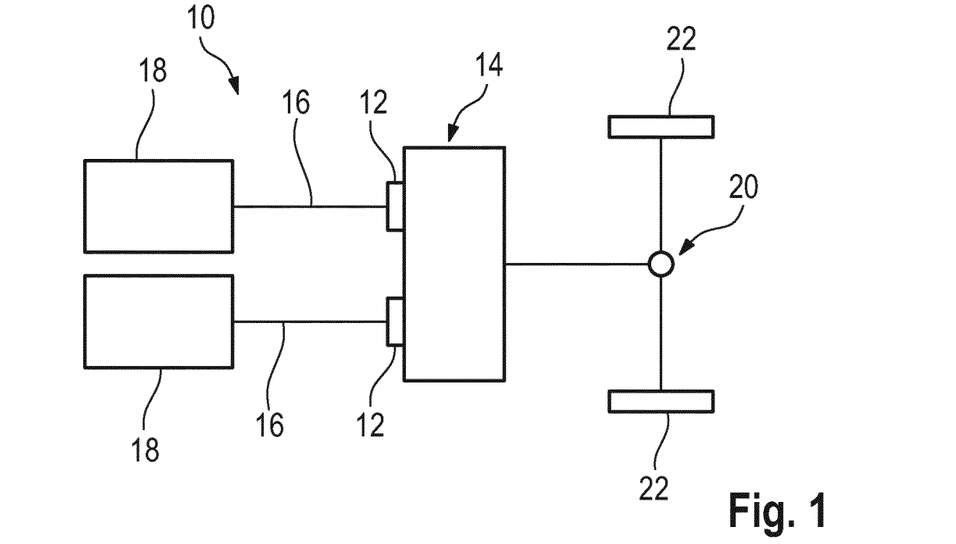
FIG. 1 shows a freewheel according to the invention in a motor vehicle drive train.

FIG. 1 shows a motor vehicle drive train 10, in which two freewheels 12 are provided.

In order for it to be possible for the individual components to be differentiated from one another, they are shaded differently, although they are shown partially in a non-sectioned manner.

The freewheels 12 are part of a clutch 14, and can connect shafts 16 of drive motors 18 in a torque-transmitting manner to an output 20.

In the embodiment which is shown, the output 20 is coupled to two wheels 22 of a motor vehicle which has the motor vehicle drive train 10.

Figure 2:
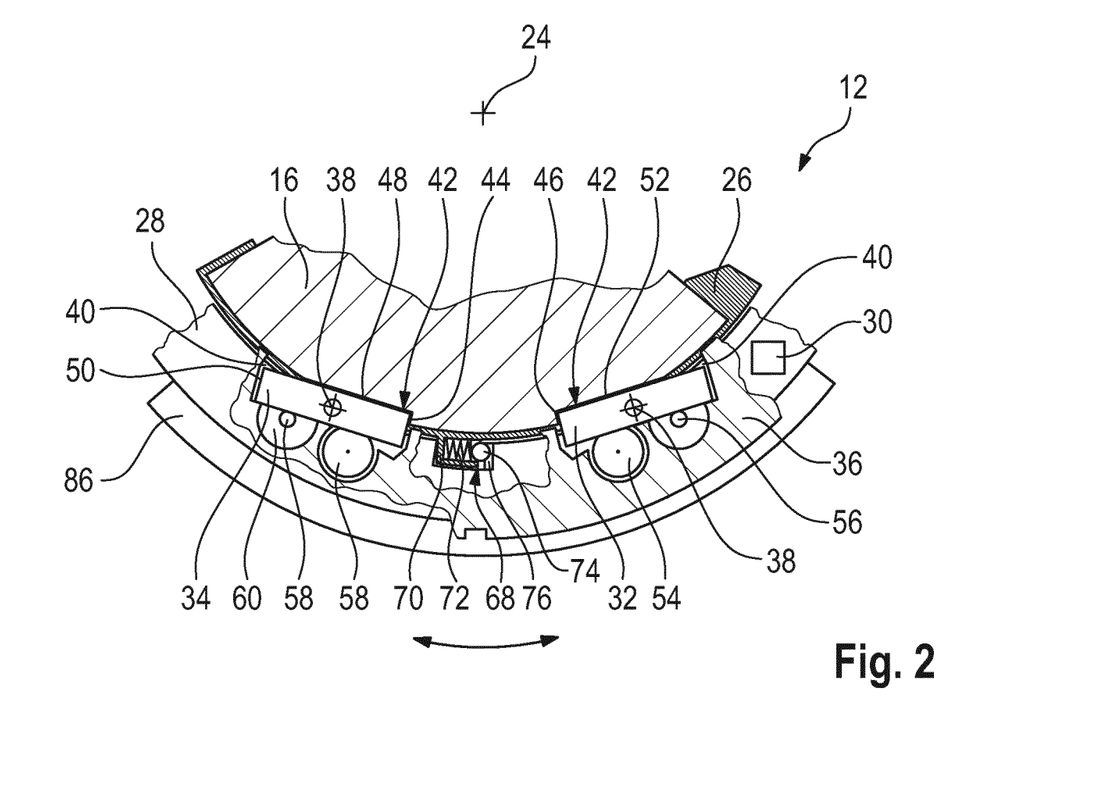
FIG. 2 shows a first embodiment of a freewheel in a cross section through a rotational axis.

FIG. 2 shows the freewheel 12 in a cross section through a rotational axis 24.

The freewheel 12 comprises the shaft 16, an annular locking pawl carrier 26, a switching ring 28 and a sensor 30 which senses the axial position of the switching ring 28.

The shaft 16 and the locking pawl carrier 26 are arranged axially behind one another. Both the shaft 16 and the locking pawl carrier 26 are arranged such that they can be rotated about the rotational axis 24.

The locking pawl carrier 26 comprises a first locking pawl 32 and a second locking pawl 34. The first locking pawl 32 and the second locking pawl 34 are fastened in a locking pawl receptacle 36 such that they can be pivoted with regard to a pivot axis 38.

The locking pawl receptacle 36 has radially inner recesses 40, in which the locking pawls 32, 34 are mounted pivotably.

The locking pawl receptacle 36 is permanently coupled fixedly to the locking pawl carrier 26 so as to rotate with it, and encloses the shaft 16 at least in sections.

The shaft 16 has coupling depressions 42 on the outer side in the circumferential direction. In the embodiment which is shown in FIG. 2, the coupling depressions 42 have a wedge shape in the cross section through the coupling depressions 42. The coupling depressions 42 have, in particular, a first, approximately radial side 44 which runs from the shell face of the shaft 16 as far as a radially deepest point 46, and a second, flatter side 48 which likewise runs from the shell face of the shaft 16 as far as the radially deepest point 46.

For reasons of clarity, components or sections which are present multiple times, such as the coupling depressions 42, are provided with a designation only once. The components relating to the locking pawl receptacle 36 and the switching ring 28 can be found on all locking pawls 32, 34. Differences are described as necessary.

The coupling depressions 42 are configured in such a way that the first and second locking pawl 32, 34 can engage in a positively locking manner into the coupling depressions 42 in a coupling state, and can couple the shaft 16 fixedly to the locking pawl carrier 26 so as to rotate with it.

Accordingly, the length of the first side 44 of the coupling depression 42 corresponds approximately to the end side 50 of the first and second locking pawl 32, 34, and the length of the second side 48 of the coupling depression 42 corresponds approximately to half the length of the longitudinal side 52 of the locking pawls 32, 34, that is to say of one arm of the locking pawls 32, 34 which are configured as two-arm levers. In particular, the first side 44 and second side 48 are shorter by from 1 mm to 10 mm, preferably 5 mm, than the end side 50 and the length of the longitudinal side 52 of the locking pawls 32, 34.

The number of coupling depressions 42 therefore corresponds to the overall number of first and second locking pawls 32, 34, and the adjacent coupling depressions 42 are of mirror-inverted configuration with respect to one another.

The locking pawls 32, 34 are actuated in each case mechanically by way of a first rod, configured as a pressure rod 54, and a second rod, configured as a tension rod 56, by an associated pressure rod 54 acting on the locking pawls 32, 34 which are configured as two-arm levers in each case at one end, and an associated tension rod 56 acting at the other end.

Figure 3:
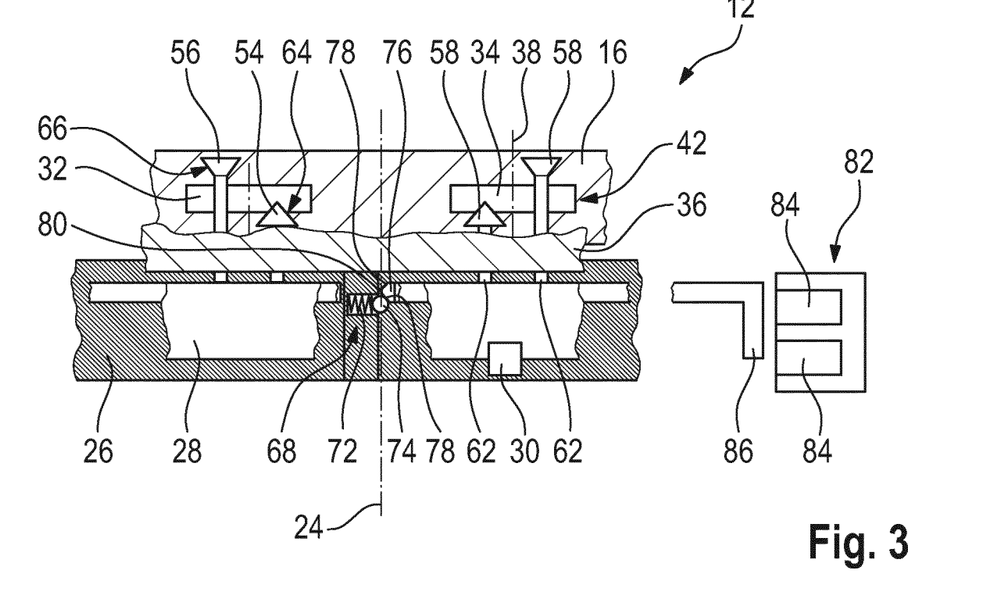
FIG. 3 shows a top view of the rotational axis of the partially cut-away freewheel from FIG. 2, FIG. 4 diagrammatically shows the engagement of a first locking pawl from FIGS. 2 and 3 into a coupling depression, FIG. 5 diagrammatically shows the engagement of a second locking pawl from FIGS. 2 and 3 into a coupling depression.

FIG. 3 shows a top view of the rotational axis 24 of the freewheel 12 from FIG. 2, partially in section, and illustrates the axial arrangement of the components of the freewheel 12.

The pressure rods 54 and tension rods 56 are received at a second rod end 58 in the axial recesses 60 of the locking pawl receptacle 36, and are fastened at a first rod end 62 to the switching ring 28. The pressure rods 54 and the tension rods 56 are arranged in pairs in the circumferential direction, with the result that the pressure rods 54 and the tension rods 56 actuate the first locking pawl 32 and the second locking pawl 34 in different pivoting directions, by a pair consisting of a pressure rod 54 and a tension rod 56 being provided as switching means for each locking pawl 32, 34.

The face of the pressure rods 54 and tension rods 56 which actuate the locking pawls 32, 34 is called a switching face. The pressure rods 54 in each case have a first switching face 64 which tapers conically toward the second rod end 58 and is of arrow-shaped configuration in this embodiment. The tension rods 56 have a second switching face 66 which tapers conically toward the first rod end 62.

It can be seen in FIG. 3 that the first switching face 64 and the second switching face 66 are offset in the axial direction, and that the locking pawls 32, 34 are arranged in the axial direction between the first and second switching face 64, 66.

The switching ring 28 encloses the locking pawl carrier 26 on the outer side (see FIG. 2), and can be moved axially between a first and a second position, with the result that the pressure rods 54 and tension rods 56 can also be moved between a first and a second position. The switching ring 28 is coupled fixedly with regard to the rotational axis to the locking pawl carrier 26 so as to rotate with it, and is connected in one piece to the latter in some circumstances.

The switching ring 28 is loaded in the first and in the second position by way of a latching means 68 for positional securing. In this embodiment, the latching means 68 is configured as a ball latching means.

The latching means 68 comprises a housing 70 which is arranged on the shell face of the locking pawl carrier 26, and has an opening in the circumferential direction of the locking pawl carrier 26. The housing 70 forms a cavity, in which a spring 72 is arranged. The spring 72 is prestressed, with the result that a ball 74 is pressed out of the opening of the housing 70.

The ball 74 loads a latching lug 76 which is arranged on the switching ring 28. The latching lug 76 comprises two latching counter-faces 78 and a termination face 80. The latching lug 76 is arranged in such a way that the termination face 80 closes the opening of the housing 70 at least partially in a middle position of the switching ring 28 between the first and second position. In the middle position, the ball 74 is accordingly arranged within the housing 70.

The latching counter-faces 78 are arranged so as to be opposed axially, and are arranged in the axial direction at an angle with respect to the rotational axis 24.

In the first and second position of the switching ring 28, the ball 74 loads the associated latching counter-face 78, and prevents an undesired movement of the switching ring 28 along the rotational axis 24.

The switching ring 28 can be moved between the first and second position by way of a magnetic actuator 82 which is arranged in a stationary manner with respect to the rotational axis 24 and comprises two coils 84. The coils 84 are arranged behind one another in the axial direction and are configured in such a way that an associated coil 84 moves the switching ring 28 into the first and second position.

The actuator 82 loads a radially inwardly pointing projection 86 of the switching ring 28, which projection 86 is connected to the switching ring 28. Accordingly, a movement of the projection 86 also leads to a movement of the switching ring 28.

It is to be emphasized that there are in each case a first and a second locking pawl 32, 34 in FIGS. 2 and 3, it also being possible for there to be two or more first locking pawls 32 and/or second locking pawls 34.

The number of coupling depressions 42 is preferably adapted to the number of locking pawls 32, 34, which does not absolutely have to be the case, however. There can also be more or fewer coupling depressions 42 than locking pawls 32, 34 overall.

By virtue of the fact that the pressure rods 54 and the tension rods 56 are connected in a mechanically fixed manner to the switching ring 28, a movement of the switching ring 28 leads to a movement of the pressure rods 54 and tension rods 56, and the position of the pressure rods 54 and tension rods 56 can be detected by way of a single sensor 30 on the switching ring 28.

It is in principle conceivable that the sensor 30 is arranged on the actuator 82 and, for example as an inductive sensor 30, detects the position of the projection 86.

FIGS. 2 and 3 show the coupling position of the switching ring 28. The locking pawls 32, 34 bear against the second side 48 of the coupling depressions 42, and couple the shaft 16 and the locking pawl carrier 26 fixedly so as to rotate together. The first locking pawl 32 couples the rotation counter to the clockwise direction, and the second locking pawl 34 couples the rotation in the clockwise direction.

The disengagement operation of the first and second locking pawls 32, 34 will be described by way of example on the basis of FIGS. 2 and 3. This corresponds to the transition from the coupling position, in which the shaft 16 and the locking pawl carrier 26 are coupled fixedly so as to rotate together, into the freewheel position, in which the shaft 16 and the locking pawl carrier 26 can rotate independently of one another.

The shaft 16 can already exhibit a torque, for example, in the clockwise direction in relation to the rotational axis 24.

In this, the second locking pawl 34 couples the rotation in the clockwise direction.

The associated coil 84 is then energized, with the result that the switching ring 28 moves out of the first position (shown in FIGS. 2 and 3) into the second position, and in the process moves axially away from the shaft 16.

The first switching face 64 of the pressure rods 54 and the second switching face 66 of the tension rods 56 load the second locking pawl 34 in a pivoting direction in the clockwise direction, and load the first locking pawl 32 in a pivoting direction counter to the clockwise direction.

The movement of the switching ring 28 leads to it being possible for the first locking pawl 32 to be disengaged.

A brief load change leads to the second locking pawls 34 which are seated fixedly by way of the original torque also being pressed into the locking pawl receptacles 36.

This load change is a customary phenomenon in the case of what is known as overrunning operation of the drive trains.

The switching ring is subsequently situated in the second position, and the ball 74 of the latching means 68 loads the opposite latching counter-face 78.

Figure 4:
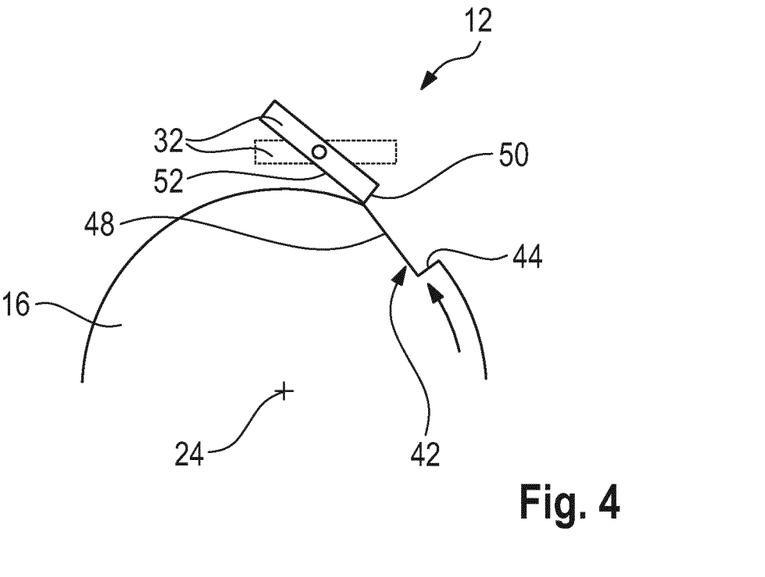
Figure 5:
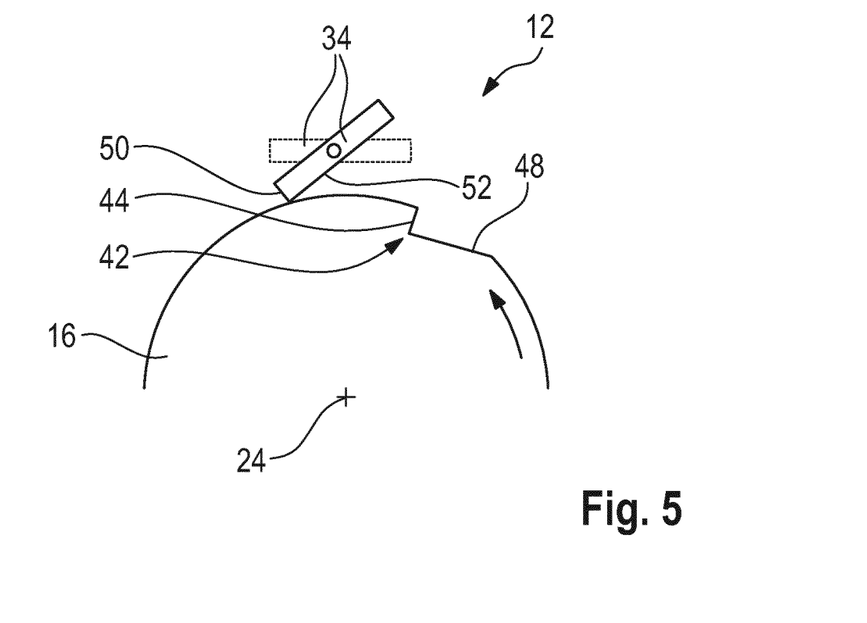

FIGS. 4 and 5 show by way of example the engagement of the first and second locking pawl 32, 34 into the coupling depressions 42 of the shaft 16.

At the beginning, the shaft 16 rotates relative to the locking pawl carrier 26 about the rotational axis 24 counter to the clockwise direction, as shown by way of an arrow. In the freewheel position, the first locking pawl 32 is not in engagement with the coupling depressions 42. This position is shown by way of the dashed first locking pawl 32.

If a request arrives to couple the shaft 16 and the locking pawl carrier 26 fixedly so as to rotate together, an associated coil 84 of the actuator 82 loads the projection 86 of the switching ring 28, with the result that the switching ring 28 moves into the first position, as shown in FIGS. 2 and 3.

The movement of the switching ring 28 leads to the pressure rods 54 and the tension rods 56 being moved in the axial direction. The first switching face 64 of the pressure rod 54 which is assigned to the first locking pawl 32 and the second switching face 64 of the tension rod 56 which is assigned to the first locking pawl 32 load the first locking pawl 32 in such a way that the first locking pawl 32 lies on the shaft 16.

The coupling depression 42 rotates with the shaft 16 counter to the clockwise direction. As soon as the second side 48 of the coupling depression 42 reaches the end of the locking pawl 32, the pressure rod 54 and the tension rod 56 which continue to load the first locking pawl 32 in the clockwise direction press one end of the first locking pawl 32 into the coupling depression 42 in such a way that the longitudinal side 52 of the first locking pawl 32 lies on the second side 48 of the coupling depression 42.

The rotation of the shaft 16 and the locking pawl carrier 26 is coupled as soon as the first side 44 of the coupling depression 42 reaches the end side 50 of the first locking pawl 32. Accordingly, the first locking pawl 32 thrusts into the coupling depression 42.

FIG. 5 shows the engagement of the second locking pawl 34 into the coupling depression 42. This sequence is comparable with the engagement of the first locking pawl 32 into the coupling depression 42, with the result that only the differences will be described.

The pressure rod 54 and the tension rod 56 load the second locking pawl 34 counter to the clockwise direction. The shaft 16 rotates relative to the locking pawl carrier 26 counter to the clockwise direction, with the result that, at the beginning of the coupling operation, the second locking pawl 34 cannot yet thrust through the second side 48 of the coupling depression 42 into the coupling depression 42.

Instead, the second locking pawl 34 is pressed against the shell face of the shaft 16. As soon as the second locking pawl 34 has reached the coupling depression 42, the rear end of the locking pawl 34 will dip into the coupling depression 42.

The engagement of the first and second locking pawl 32, 34 is the same in terms of the method if the shaft 16 is rotated in the clockwise direction. In this case, the first and second locking pawl 32, 34 swap their method of operation, with the result that the second locking pawl 34 thrusts into the coupling depression 42, and the first locking pawl 32 is engaged into the coupling depression 42.

Figure 6:
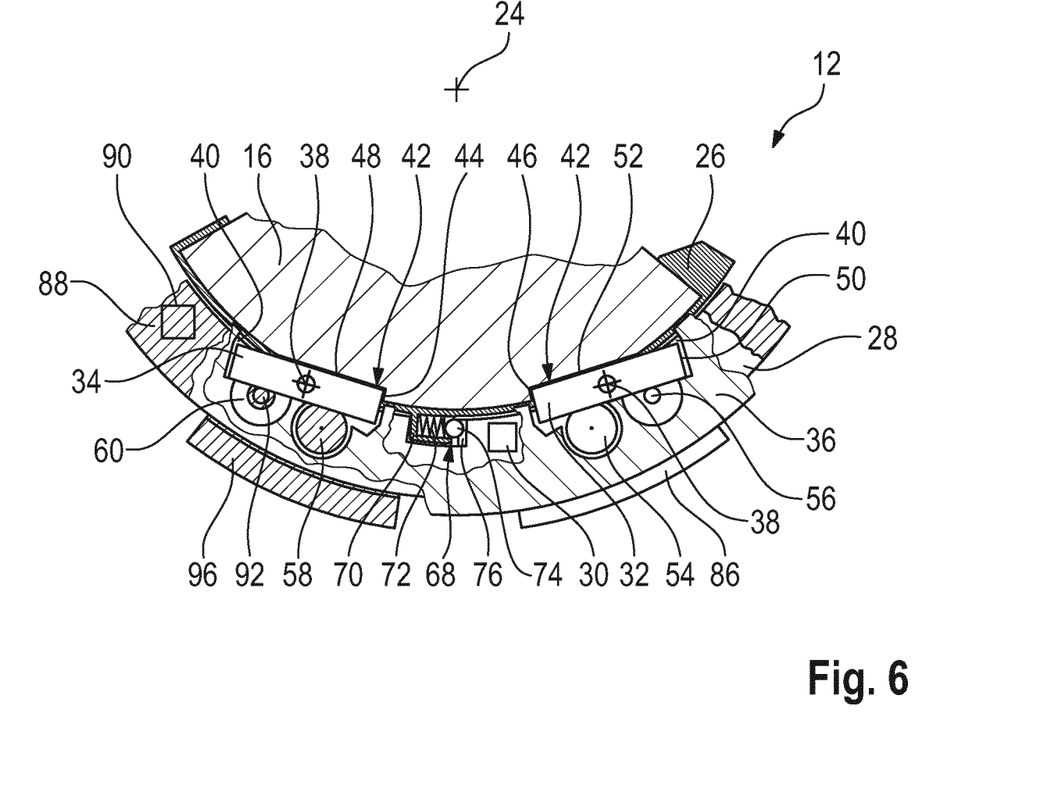
FIG. 6 shows a second embodiment of a freewheel in a cross section through the rotational axis.

A freewheel 12 in accordance with a second embodiment will now be described on the basis of FIGS. 6 and 7, which second embodiment corresponds partially to the first embodiment, with the result that merely the differences will be described in the following text. Identical and functionally identical components are provided with the same introduced designations.

In contrast to the first embodiment, the freewheel 12 of the second embodiment comprises a second switching ring 88 and a second sensor 90 which are functionally identical to the switching ring 28 and the sensor 30. The sensor 90 detects the position of the switching ring 88 which can be moved in the axial direction between a first and a second position.

The switching ring 88 comprises the tension rod 56 and the pressure rod 54 which is assigned to the second locking pawl 34, and the switching ring 28 comprises the tension rod 56 and the pressure rod 54 which is assigned to the first locking pawl 32.

The switching ring 88 therefore loads the second locking pawl 34 which couples the rotation of the shaft 16 and the locking pawl carrier 26 in the clockwise direction, and the switching ring 28 loads the first locking pawl 32 which couples the rotation of the shaft 16 and the locking pawl carrier 26 counter to the clockwise direction.

The switching rings 28, 88 are arranged axially behind one another, and can be moved relative to one another in the axial direction. The pressure rod 54 and the tension rod 56 of the switching ring 88 protrude through holes 92 in the switching ring 28.

In order to load the switching ring 88 in the first or second position, a further latching means 94 is provided which is functionally identical to the latching means 68. The latching means 68 and the latching means 94 are arranged axially behind one another.

The switching ring 88 also has a radially inwardly pointing projection 96 which is functionally identical to the projection 86 of the switching ring 28. The projections 86 and 96 are arranged in sections in the circumferential direction of the switching rings 28 and 88 and behind one another, with the result that the switching rings 28, 88 can be moved by way of a single actuator 82.

Figure 7:
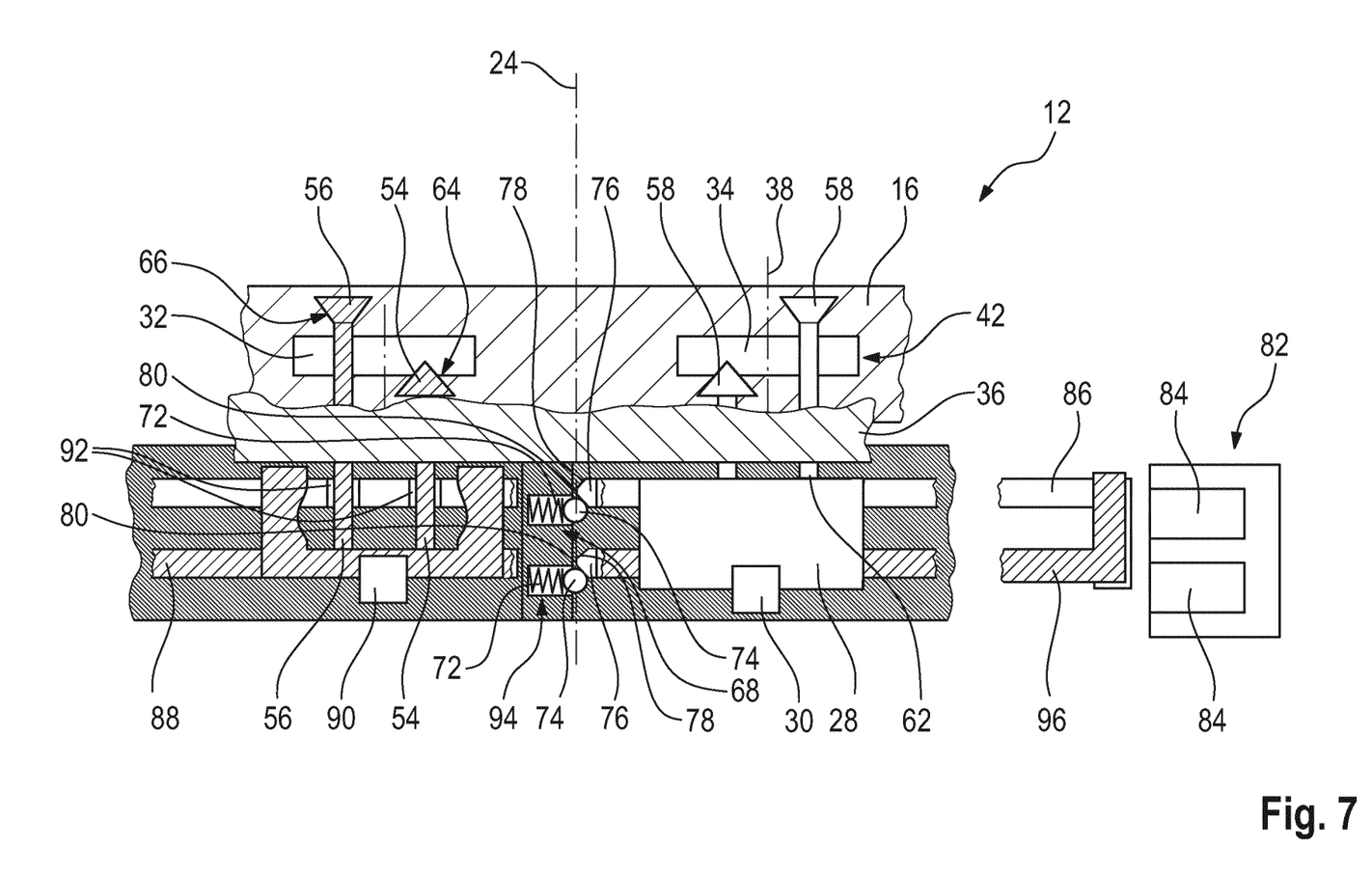
FIG. 7 shows a top view of the rotational axis of the partially cut-away freewheel from FIG. 6.

FIG. 7 shows that the switching rings 28, 88 in each case have only one projection 86, 96. However, it is conceivable, in particular, that the switching rings 28, 88 have a multiplicity of projections 86 and 96 which are arranged in an alternating manner in the circumferential direction.

The relative axial movability of the switching rings 28 and 88 with respect to one another leads to it being possible for the engagement and disengagement operation of the first and second locking pawl 32, 34 to take place in a delayed and asynchronous manner, as a result of which the time window for closing and opening the freewheel is increased. The locking pawl 32, 34 which first of all encounters the coupling depression 42 can already latch in, whereas the other locking pawl which reaches its coupling depression 42 later does not delay the movement of the other one. Accordingly, the disengagement also functions in an asynchronous manner. In the case of the disengagement operation (shaft 16 is already torque-transmitting in the clockwise direction), the first locking pawls 32 can be completely disengaged rapidly because the locking pawls 34 are still held on account of the shaft 16 which presses against them, and the switching ring 28 provides greater resistance to a rotation than the switching ring 88.

During a short load change of the shaft, the locking pawls 34 are briefly loaded to a lesser extent or not at all by the shaft, with the result that, on account of the maintained pressure on the switching ring 28 by way of the actuator 82, the switching ring 28 can be pivoted and the locking pawls 34 can unlatch. The movement of the locking pawls 32, 34 is therefore asynchronous.

There is also an asynchronous movement of the locking pawls 32, 34 in the case of the latching of the locking pawls 32, 34 into the coupling depressions 42.

Figure 8:
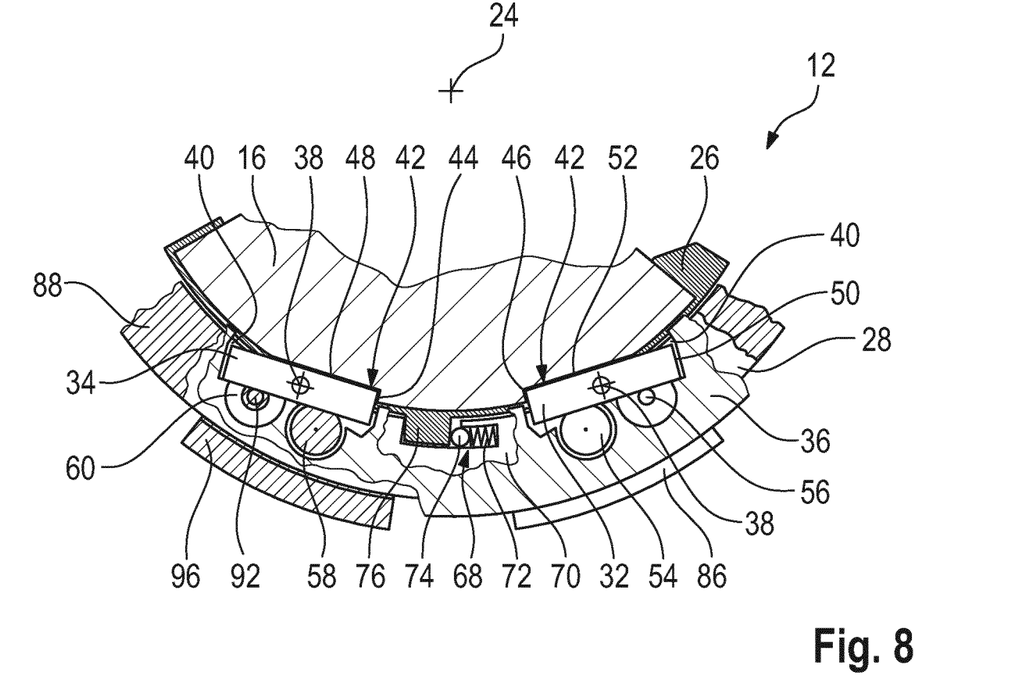
FIG. 8 shows a third embodiment of a freewheel in a cross section through the rotational axis of the freewheel.

FIG. 8 shows a cross section through the rotational axis 24 of the freewheel 12 in a third embodiment which is substantially functionally identical to the first and second embodiments, with the result that only the differences will be described. Identical and functionally identical components are provided with the same designations, and reference is made to the above explanations with regard to their construction and their function.

In contrast to the first and second embodiment, only one sensor 30 is provided on the actuator 82 in FIG. 8, which sensor 30 detects the positions of the switching rings 28, 88.

The sensor 30 can be based, for example, on an inductive operating principle. It is also conceivable that the sensor 30 detects the position of the projections 86, 96 by way of a laser and/or a distance measurement. In principle, any sensor is conceivable which detects the positions of the switching rings 28, 88.

A further difference is the construction of the latching means 68. The latching lug 76 is arranged on the shell face of the locking pawl carrier 26, and the housing 70 is realized by way of a radially inner recess in the switching ring 28.

The invention makes a rapid switching speed possible; moreover, there are low adjustable masses.

The invention is not restricted to the embodiments which are shown. In particular, individual features of one embodiment can be combined in any desired manner with other features, independently of the other features of the corresponding embodiment.

What is claimed is:
1. A freewheel for a motor vehicle drive train, comprising:
a locking pawl carrier which is rotatable with respect to a rotational axis;
a first locking pawl and a second locking pawl;
a locking pawl receptacle, wherein the first locking pawl and the second locking pawl are fastened pivotably in the locking pawl receptacle and wherein the locking pawl receptacle is fixedly coupled to the locking pawl carrier;

a shaft, wherein the shaft is rotatable about the rotational axis and has a first coupling depression and a second coupling depression, wherein the first locking pawl is engageable into the first coupling depression and the second locking pawl is engageable into the second coupling depression;

at least one switching ring which is coupled fixedly to the locking pawl carrier so as to rotate with the locking pawl carrier;

an actuator, wherein the at least one switching ring is movable along the rotational axis by the actuator between a first position and a second position and wherein the first locking pawl and the second locking pawl are pivotable by the at least one switching ring; and a sensor, wherein a position of the at least one switching ring is detectable by the sensor;

wherein the first locking pawl engages in a positively locking manner into the first coupling depression in a coupling position such that the first locking pawl couples the locking pawl carrier and the shaft fixedly so as to rotate together in a first rotational direction;

wherein the second locking pawl engages in a positively locking manner into the second coupling depression in the coupling position such that the second locking pawl couples the locking pawl carrier and the shaft fixedly so as to rotate together in a second rotational direction;

wherein a movement of the at least one switching ring in one direction loads the first locking pawl and the second locking pawl in opposite pivoting directions and fixes a position of the first locking pawl and the second locking pawl;

wherein the at least one switching ring comprises a first switching ring and a second switching ring, wherein the second switching ring is movable axially relative to the first switching ring, and wherein the first switching ring actuates the first locking pawl and the second switching ring actuates the second locking pawl.

2. The freewheel according to claim 1, wherein the first switching ring and the second switching ring each have a respective first rod and a second rod which are configured at least in sections parallel to the rotational axis and wherein the respective first rod and the second rod are coupled at a respective first rod end to the respective switching ring.

3. The freewheel according to claim 1, wherein the at least one switching ring has a radially inwardly pointing projection.

4. The freewheel according to claim 1, wherein the actuator is stationary.

5. The freewheel according to claim 4, wherein the actuator is a magnetic actuator.

6. The freewheel according to claim 1, wherein the locking pawl carrier has a latch.

7. The freewheel according to claim 6, wherein the latch is a ball latch.

8. A freewheel for a motor vehicle drive train, comprising:
a locking pawl carrier which is rotatable with respect to a rotational axis;
a first locking pawl and a second locking pawl;
a locking pawl receptacle, wherein the first locking pawl and the second locking pawl are fastened pivotably in the locking pawl receptacle and wherein the locking pawl receptacle is fixedly coupled to the locking pawl carrier;

a shaft, wherein the shaft is rotatable about the rotational axis and has a first coupling depression and a second coupling depression, wherein the first locking pawl is engageable into the first coupling depression and the second locking pawl is engageable into the second coupling depression;

at least one switching ring which is coupled fixedly to the locking pawl carrier so as to rotate with the locking pawl carrier;

an actuator, wherein the at least one switching ring is movable along the rotational axis by the actuator between a first position and a second position and wherein the first locking pawl and the second locking pawl are pivotable by the at least one switching ring; and a sensor, wherein a position of the at least one switching ring is detectable by the sensor;

wherein the first locking pawl engages in a positively locking manner into the first coupling depression in a coupling position such that the first locking pawl couples the locking pawl carrier and the shaft fixedly so as to rotate together in a first rotational direction;

wherein the second locking pawl engages in a positively locking manner into the second coupling depression in the coupling position such that the second locking pawl couples the locking pawl carrier and the shaft fixedly so as to rotate together in a second rotational direction;

wherein a movement of the at least one switching ring in one direction loads the first locking pawl and the second locking pawl in opposite pivoting directions and fixes a position of the first locking pawl and the second locking pawl;

wherein the at least one switching ring has a first rod and a second rod which are configured at least in sections parallel to the rotational axis and are coupled at a first rod end to the at least one switching ring.

9. The freewheel according to claim 8, wherein the first rod has a first switching face which tapers conically toward a second rod end and wherein the second rod has a second switching face which tapers conically toward the first rod end.

10. The freewheel according to claim 9, wherein the first switching face and the second switching face lie offset axially with respect to one another.

11. The freewheel according to claim 8, wherein the first rod and the second rod extend into a recess of the locking pawl receptacle and are mounted axially displaceably in the locking pawl carrier.

12. A freewheel for a motor vehicle drive train, comprising:
a locking pawl carrier which is rotatable with respect to a rotational axis;
a first locking pawl and a second locking pawl;
a locking pawl receptacle, wherein the first locking pawl and the second locking pawl are fastened pivotably in the locking pawl receptacle and wherein the locking pawl receptacle is fixedly coupled to the locking pawl carrier;

a shaft, wherein the shaft is rotatable about the rotational axis and has a first coupling depression and a second coupling depression, wherein the first locking pawl is engageable into the first coupling depression and the second locking pawl is engageable into the second coupling depression;

at least one switching ring which is coupled fixedly to the locking pawl carrier so as to rotate with the locking pawl carrier;

an actuator, wherein the at least one switching ring is movable along the rotational axis by the actuator between a first position and a second position and wherein the first locking pawl and the second locking pawl are pivotable by the at least one switching ring; and a sensor, wherein a position of the at least one switching ring is detectable by the sensor;

wherein the first locking pawl engages in a positively locking manner into the first coupling depression in a coupling position such that the first locking pawl couples the locking pawl carrier and the shaft fixedly so as to rotate together in a first rotational direction;

wherein the second locking pawl engages in a positively locking manner into the second coupling depression in the coupling position such that the second locking pawl couples the locking pawl carrier and the shaft fixedly so as to rotate together in a second rotational direction;

wherein a movement of the at least one switching ring in one direction loads the first locking pawl and the second locking pawl in opposite pivoting directions and fixes a position of the first locking pawl and the second locking pawl;

wherein the locking pawl carrier has a latch;

wherein the latch is a ball latch.

* * * * *